March 18, 1947. C. H. PETSKEYES 2,417,782
BREAD TRANSFERRING MEANS FOR BREAD SLICING MACHINE
Filed June 9, 1945 2 Sheets-Sheet 1

INVENTOR.
Charles H. Petskeyes
BY Clarence E. Threedy
His Attorney

March 18, 1947.   C. H. PETSKEYES   2,417,782
BREAD TRANSFERRING MEANS FOR BREAD SLICING MACHINE
Filed June 9, 1945   2 Sheets-Sheet 2

INVENTOR.
Charles H. Petskeyes
BY Clarence E. Thready
His Attorney

Patented Mar. 18, 1947

2,417,782

UNITED STATES PATENT OFFICE 2,417,782

BREAD TRANSFERRING MEANS FOR BREAD SLICING MACHINES

Charles H. Petskeyes, Davenport, Iowa, assignor to Gelman Manufacturing Company, Rock Island, Ill., a corporation of Illinois Application June 9, 1945, Serial No. 598,456

3 Claims. (Cl. 198—23)

This invention relates to certain new and useful improvements in bread transferring means for bread slicing machines. More particularly the invention has reference to an adjustable provision for transferring successively loaves of bread from a chute to a platform for movement upon the latter.

In bread slicing machines such as disclosed in U. S. Patents Nos. 2,276,590, 2,252,028, 2,235,503, 2,232,558, and 2,230,797, the loaves of bread are received from an inclined chute of the bread slicing machine to a platform and are moved therealong by a plurality of follower bars movable over the runway by means of sprocket drive means. In order to obtain the best results, it is essential that the loaves of bread be successively transferred to the runway in timed relation with respect to the movement of the followers; otherwise it is possible that a loaf of bread may be deposited on a follower and be caused to tilt or otherwise roll over and thereby interfere with the proper operation of other mechanism of the machine, such for example, the wrapping mechanism or that shown in my copending application, Serial No. 598,465.

To overcome the foregoing objections, it is the object of this invention to provide a means for transferring the loaves of bread from the chute to the runway in timed relation with the movement of the follower in a manner such that the trailing edge of each loaf of bread will be deposited or transferred by the transfer means to a position upon the runway just immediately forward of the followers so that it will be properly picked up by the followers and conveyed over the runway into the wrapping mechanism.

Another object of the invention is to associate with such transfer means a mechanism which will enable the operator, without interfering with the movement of the bread or operation of the machine, to adjust or vary the width of the transfer means to bring about deposit or transfer of the loaves of bread upon the runway in timed relation with respect to the movement of the followers, thereby resulting in a proper operation of the wrapping mechanism.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
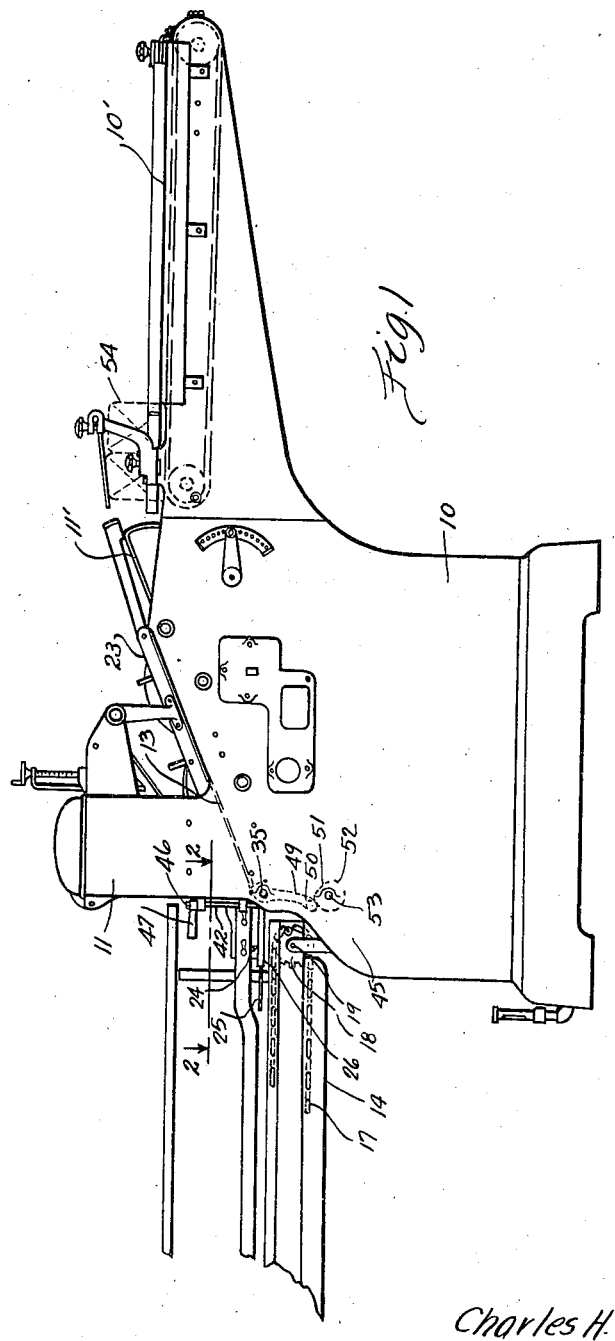
Fig. 1 is a side elevational view of a bread slicing machine with which my invention is associated.

The drawings illustrate the preferred form of construction by which the several objects of my invention are accomplished. In this connection, the bread slicing machine is indicated at 10 and provides a housing 11 within which are confined the slicing knives (not shown). These slicing knives, in a manner well known in the art, are reciprocated in opposite directions with respect to each other and are intended to slice bread gravitated or otherwise moved to the knives down the chute 13.

Associated with this bread slicing machine 10 is a supporting structure 14 which supports a runway 15 to which the bread is transferred from the chute 13. Movable longitudinally of this runway 15 and extending transversely with respect thereto, are a plurality of followers 16. These followers 16 are connected to sprocket chains 17 which pass over sprocket wheels 18 carried by shafts 19, with one of the shafts 19 driven by a suitable driving sprocket and chain arrangement 20, in turn driven by a sprocket drive 21 including a sprocket gear 22. The bread, as transferred from the chute 13 to the runway 15, is guided in its movement by suitable guide rails 23.

The means for transferring the bread from the chute 13 to the runway 15 comprises a tiltable platform 24. This platform 24 comprises two plates 25 and 26. The plate 26 has its marginal edge portions bent to provide parallel grooves 28 which receive the marginal edge portions 29 of the plate 25. These plates are connected together by toggle structures 30 each comprising link elements 31 and 32, the link element 31 being pivotally connected as at 33 to the plate 25 whereas the link element 32 is pivotally connected as at 34 to a shaft 35. These toggle structures 30 are connected together by a connecting link 36. An adjusting link 37 is connected to one of the links 32 of one of the toggle structures as at 38, and this operating link is pivotally connected as at 39 to a bearing sleeve 40 in turn connected as at 41 to a shaft 42. This shaft 42 is rotatable in the bearings 43 connected as at 44 to a wall 45 of the housing 11 of the bread slicing machine 10. Secured to the upper end portion of this shaft 42 as at 46 is a handle 47 by means of which the shaft 42 is rotated.

The ends of the rocker shaft 35 are journaled in suitable bearings 48, and at one end of this rocker shaft 35 there depends an arm 49 having connected thereto a roller 50. This roller 50 is intended to engage the edge 51 of a cam 52 mounted upon a shaft 53 on which the main drive sprocket gear is connected.

As hereinbefore stated, it is essentially necessary in the operation of bread wrapping and bread slicing machines that the loaves of bread be properly located upon the runway over which it is conveyed, otherwise the loaves of bread might be delivered too late or too soon to the wrapping mechanism after having been sliced. By the use of a transfer means constructed in accordance with the foregoing description, the operator is able to adjust the transfer means to vary its width so as to bring about timed relationship between the deposit of the loaves of bread on the runway and the movement of the followers 16.

In operation of the bread slicing machine herein described, bread is moved in a suitable manner, either by gravity or by mechanism, from the chute 13 onto the platform 24 for transfer upon the runway 15. The platform 24 is supported by the rocker shaft 35, and this rocker shaft 35 by action of the cam 52 is timed to tilt to the position shown in dotted lines in Fig. 1, so as to deposit the loaf of bread 54 upon the runway 15 just immediately forward of the follower 16 when such follower is moved by the sprocket chains to the position indicated at 16'. Should the operator find that the bread is tilting off the platform before it should be transferred to the runway 15, by manipulating the handle 17 he will effect rotation of the shaft 42 and this will cause the toggle structures 30 to retract or expand so as to project or retract the plate 25. In this manner the plate 25 may be adjusted to the proper position to effect the proper transfer of the loaf of bread 54 to the runway 15 in the position shown in Fig. 2.

Figures 2, 3:
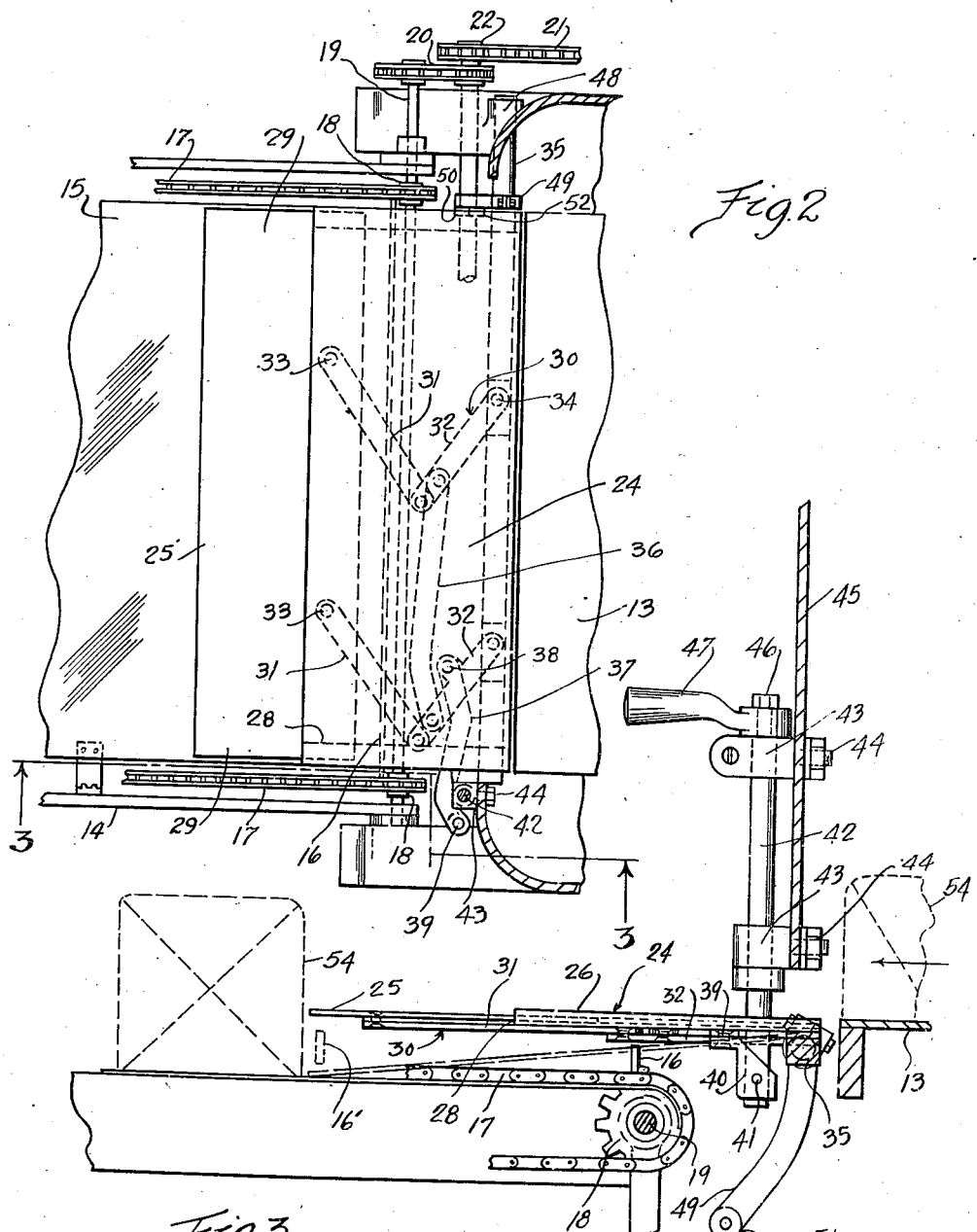
Fig. 2 is a fragmentary sectional detail view of the same, taken substantially on line 2—2 of Fig. 1.
Fig. 3 is a fragmentary sectional detail view taken substantially on line 3—3 of Fig. 2.

Fig. 1 is a fragmentary side elevational view of a bread slicing machine with which my invention is associated. In this machine loaves of bread 54 to be sliced are conveyed to the chute 13 by a belt conveyor 10' and a transfer plate 11' in a manner shown in my co-pending applications, Serial Nos. 598,454 and 598,455, the loaves of bread being guided down the chute by the guide rails 23.

The simplicity of construction of my invention is self-evident from the foregoing description taken in connection with the accompanying drawings, and by the use of a device constructed in the manner disclosed, the loaves of bread may be properly deposited upon the runway for movement thereupon by action of the followers 16.

While I have illustrated and described the preferred form of construction of carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A bread slicing machine, mechanism for transferring loaves of bread from a bread chute of said slicing machine to a conveyor thereof forwardly of a follower upon said conveyor, said mechanism comprising a pair of rockable plates interfitted together for adjustment relative to each other in the direction of movement of the loaves of bread down the chute to the conveyor, and means for rocking said plates.

2. A bread slicing machine, mechanism for transferring loaves of bread from a bread chute of said slicing machine to a conveyor thereof forwardly of a follower upon said conveyor, said mechanism comprising a pair of rockable plates interfitted together for adjustment relative to each other in the direction of movement of the loaves of bread down the chute to the conveyor, means for rocking said plates, and means for adjusting said plates relative to each other when said slicing machine is in operation as well as when said machine has ceased operation.

3. Mechanism for transferring loaves of bread from a chute of a slicing machine to a conveyor thereof comprising a pair of bread transfer plates slidably connected together in a direction with respect to the movement of bread down the chute to the conveyor, means rockably supporting said transfer plates for movement from bread receiving position from the chute to bread discharging position to the conveyor, and means for adjusting said plates relative to each other, said last-named means including a pair of toggles having connection with said plates, a link connecting said toggles together, an operating handle rotatably supported by the slicing machine, and a link connecting said handle to said toggles.

CHARLES H. PETSKEYES.

REFERENCES CITED

The following references are of record in the file of this patent:

UNITED STATES PATENTS

| Number | Name | Date |
|---|---|---|
| 2,179,798 | Petskeyes | Nov. 14, 1939 |
| 2,311,577 | Rose | Feb. 16, 1943 |
| 2,379,911 | Kottmann | July 10, 1945 |